United States Patent [19]

Danforth

[11] 4,063,637
[45] Dec. 20, 1977

[54] DEVICE FOR PROVIDING A STORAGE COMPARTMENT FOR A HELMET

[76] Inventor: Byron Danforth, 16 Manchester Road, Eastchester, N.Y. 10709

[21] Appl. No.: 716,122

[22] Filed: Aug. 20, 1976

[51] Int. Cl.² .................. B65D 85/15; B62J 11/00
[52] U.S. Cl. .................................. 206/8; 70/59; 223/84; 224/33 R; 220/6; 220/19
[58] Field of Search ............... 220/19, 6; 206/8; 70/18, 59; 224/33 R, 33 A; 248/203, 289 R, 291, 293, 309 R, 309 A; 223/84

[56] References Cited

U.S. PATENT DOCUMENTS

| 2,635,781 | 4/1953 | Hume | 220/19 |
| 3,580,436 | 5/1971 | DiLuco | 206/8 |
| 3,604,671 | 9/1971 | Walker | 220/6 |
| 3,831,407 | 8/1974 | Coleman | 206/8 |
| 3,837,545 | 9/1974 | Rogers, Jr. | 248/203 |
| 3,868,155 | 2/1975 | Cherubini | 220/6 |

*Primary Examiner*—William T. Dixson, Jr.
*Assistant Examiner*—Joseph M. Moy
*Attorney, Agent, or Firm*—Bauer, Amer & King

[57] ABSTRACT

A convenience device for a motorcycle helmet formed of pivotally interconnected flexible structural elements or members which unfold from a compact storage condition into encircling relation about the helmet, to thereby bound a compartment in which the helmet can be safely stored during non-use, and which can be padlocked or otherwise attached to the parked motorcycle.

5 Claims, 5 Drawing Figures

U.S. Patent     Dec. 20, 1977     4,063,637
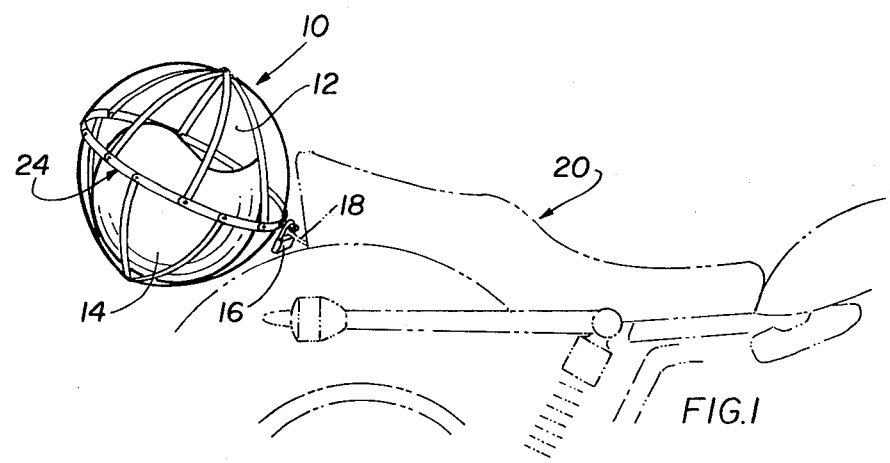
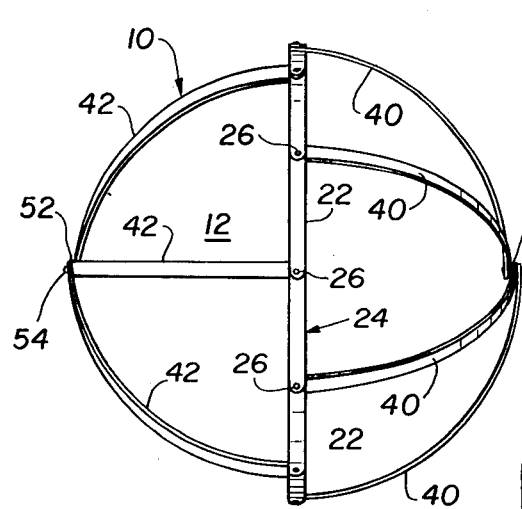
FIG.2
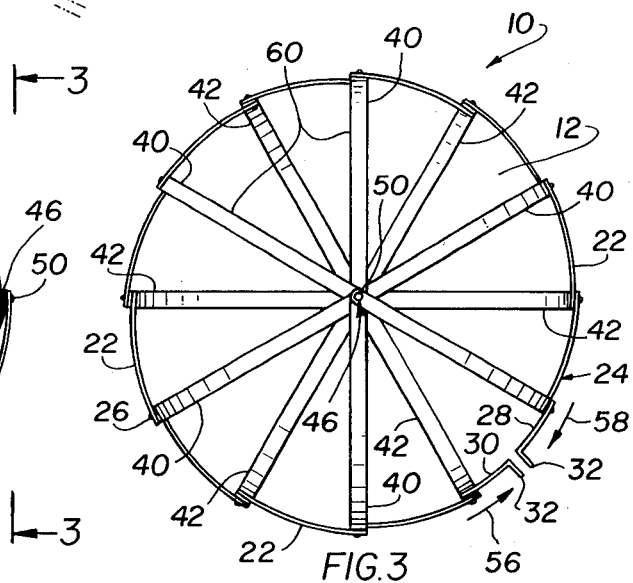
FIG.3
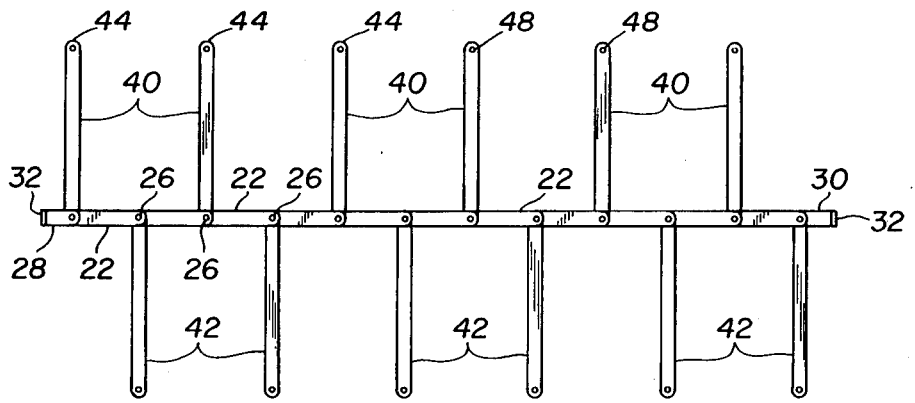
FIG.4
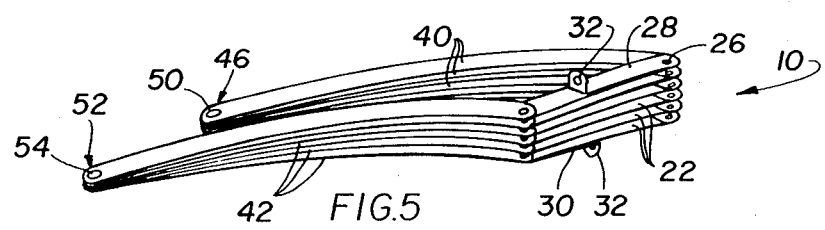
FIG.5

DEVICE FOR PROVIDING A STORAGE COMPARTMENT FOR A HELMET

The present invention generally relates to a convenience or accessory product for motorcyclists, and more particularly to a device for conveniently and safely storing the cyclist's helmet during non-use.

As generally understood, a protective helmet is standard equipment for a motorcyclist. The within convenience product facilitates the storage of this required item of equipment by providing an encircling cage-like structure in which it can be stored while in attached relation to the motorcycle. Underlying the present invention is not only the recognition of the need for this helmet-encircling structure, but also the further recognition that the generally spherical shape of the helmet dictates a similar corresponding shape for the encircling structure, and thus that such a shaped structure can be achieved by unfolding from a compact, storage condition into its required three-dimentional shape when in use. Thus, the within helmet-encircling structure is itself convenient to store when not in use, as when the helmet is being used, and yet is readily provided with adequate size to accommodate the helmet therein, when necessary to do so.

Broadly, an object of the present invention is to provide a convenience product to facilitate the safe storage of a motorcyclist's helmet which during its non-use does not contribute to any inconvenience or otherwise detract from its utility. Specifically, it is an object to provide a helmet-encircling structure or device characterized by its simplicity of construction, and adapted to take up only an optimum minimum amount of storage space when not in use, and yet bound an adequately sized spherical volume to accommodate the helmet when put to use.

A helmet-encircling device for providing a helmet storage compartment demonstrating objects and advantages of the present invention includes plural horizontally oriented members of flexible construction material pivotally interconnected end to end and adapted, in use, to be placed in flexed relation so as to bound a circumference of the helmet storage compartment. Attached to the circumference formed of these members are additional plural transversely oriented members of similar flexible construction material which extend in flexed relation in opposite directions from spaced pivotal connections about said circumference band or member to a common juncture at which they are interconnected to each other so as to bound upper and lower helmet-enclosing spheres which together form the helmet storage compartment. After use of the construction as just described, the members thereof are movable about their pivotal connections into a compact storage condition, which, in an obvious manner, contributes to convenient use of the helmet-encircling device.

The above brief description, as well as further objects, features, and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a front elevational view illustrating the storage position of a motorcycle helmet within the enclosure-forming device or storage compartment provided for said helmet according to the present invention;

FIG. 2 is a side elevational view of the within device illustrating further structural details;

FIG. 3 is a plan view of the device as seen in the direction of the arrows along line 3—3 of FIG. 2;

FIG. 4 is a plan view of the device in a partially disassembled condition, which illustrates the cooperative relation of the various components of the device; and FIG. 5 is a perspective view illustrating the compact storage condition of the device.

Reference is now made to the drawings, and in particular to FIGS. 1, 2 and 3 in which the inventive device hereof generally designated 10, is illustrated in its unfolded three-dimensional condition in which it bounds an internal, generally spherical volume which serves as a storage compartment 12 for a motorcycle helmet 14. In a manner which will be subsequently described in detail, the device 10, or more particularly the structural components thereof, are placed in an encircling relation about the helmet 14. As illustrated in FIG. 1, device 10 is then conveniently attached, as by a lock 16, to an appropriate structural member 18 of the motorcycle 20. From the foregoing, the convenience of the device 10 should be readily apparent since it permits the cyclist to leave his helmet 14 safely stored in the compartment 12 which is attached to, and thus is at the same location where his motorcycle 20 is parked.

The convenience and utility of the device 10 is significantly enhanced by its ability to assume a compact storage condition when not in use. This storage condition is illustrated in FIG. 5. As will be subsequently described in greater detail, the storage condition of FIG. 5 results from unfolding or collapsing the structural members of the device 10 from their positions bounding the three-dimensional spherical volume 12 into adjacent overlying positions, as illustrated in FIG. 5. Stated another way, in the FIG. 5 storage condition of the device 10, the structural members do not bound any three-dimensional shape, so that the device 10 can be readily placed in a pouch or other storage compartment of the motorcycle 20, or even be conveniently carried on the person of the cyclist.

The construction of the device 10, which according to the present invention provides both a compact storage condition and a three-dimensional sphere, is illustrated in FIGS. 2 and 3. However, reference should first be made to FIG. 4 which illustrates the device 10 in a partially disassembled condition. As illustrated in FIG. 4, device 10 includes a selected number of structural members, individually and collectively designated 22, which in the three-dimensional arrangement define or bound a circumference, designated by the reference number 24 in FIGS. 1, 2 and 3 for the storage compartment 12. Each member 22 will be understood to be identically constructed of an appropriate tempered or case treated steel, such as for example so-called "shim" stock, which because of its hardness and flexibility, is commonly used in the manufacture of hacksaw blades. As further illustrated in FIG. 4, the construction members 22 are arranged end to end and connected to each other in this arrangement by rivets, individually and collectively designated 26, which rivets allow each member 22 to be moved through pivotal traverses about the rivot connections 26. The significance of this will soon be apparent.

Completing the end to end arrangement of the members 22 and, more particularly, located at opposite ends thereof are two connecting members 28 and 30 which, except for size, are similar to the members 22, and which also differ in that each at its free end has a projection 32 (see FIG. 3) with an opening to accommodate the hasp of the previously noted lock 16, or some other appropriate connecting device. Once the members 22, including the end connecting members 28 and 30, are interconnected at the locations 26 as just described in connection with FIG. 4, these members are readily projected into the previously noted circular shape or circumference 24 merely by bringing the end members 28 and 32 into adjacent position, again as is clearly illustrated in FIG. 3.

Cooperating with the circumference 24 are additional structural elements or members, now to be described, which provide the upper and lower spherical volumes which together constitute the storage compartment 12. One group of these additional members, individually and collectively designated 40, extend in one direction transversely of the members 22, when in their horizontal orientation, while the other group, individually and collectively designated 42, extend transversely thereof in an opposite direction. As is clearly illustrated in FIG. 4, the group of members 40 and 42 are preferably each 6 in number and are alternately spaced along the end to end interconnected arrangement of members 22. Moreover, as clearly illustrated in FIG. 4, each member of the groups 40 and 42 is capable of pivotal traverses, since each utilizes a pivotal connection 26 of the members 22.

To utilize the members 40 and 42 to provide the upper and lower spherical volumes, after the interconnected members 22 are flexed into the circular shape or circumference 24, this necessarily provides a circumferentially spaced position to the members 40 and also to the members 42. Taking the members 40 first, the free ends 44 thereof are flexed towards the top centerpoint of the sphere 12 and thus to a common juncture, designated 46. Once this is achieved, since each end 44 will be understood to have an opening 48, the overlapping relation of the ends 44 places the openings 48 in alignment and an appropriate connector, such as a screw 50 or the like, is then projected or inserted through the openings 48 to hold the members 40 in their flexed condition which bounds the hemispherical volume.

In a similar fashion, members 42 are also flexed to a common juncture 52 and a connector 54 utilized to retain the flexed shape thereof.

From the foregoing description it should be readily appreciated that the device 10 is characterized by the simplicity of its construction, as well as by the previously noted three-dimensional and compact storage conditions, respectively illustrated in FIG. 1 and 5, which it can readily assume. For completeness sake, and as perhaps is best illustrated by progressive examination of FIGS. 5 and 3, device 10 hereof is readily unfolded from its compact storage condition illustrated in FIG. 5 into its three-dimensional condition illustrated in FIG. 3 by pivoting members 40 and 42 about the pivots 26 thereby placing members 40, 22 and 42 in general alignment. Following this, the members 40 and the members 42 are simultaneously unfolded relative to their points of interconnection 48, 54, respectively. As is perhaps best illustrated in FIG. 3, this unfolding movement of the members 40 and 42 contemplates bringing the end connectors 28 and 30 through encircling movements 56 and 58 towards each other and thus about the helmet 14 (not shown in FIG. 3) appropriately placed within the spherical volume 12 which is bounded by the device 10. As illustrated in FIG. 3, each general triangular space 60 between adjacent members 40 or 42 is of an optimum smaller size than the helmet 14 so that the helmet cannot be removed through these openings. In this manner, device 10 serves as a useful device for forming a storage compartment for the helmet 14 when it is not in use.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A helmet-encircling device for providing a helmet storage compartment comprising plural horizontally oriented rigid, leaf-like members of flexible construction material pivotally interconnected end to end in flexed relation so as to bound a circumference of said helmet storage compartment, and plural transversely oriented rigid, leaf-like members of similar flexible construction material extending in flexed relation in opposite directions from spaced pivotal connections about said circumference to a common juncture for interconnection to each other so as to bound upper and lower helmet-enclosing spheres for said helmet storage compartment, said members having overlapping portions at said pivotal connections whereby after use said members of said device are movable about said pivotal connections into a relatively flat compact storage condition.

2. A device providing a helmet storage compartment as claimed in claim 1 wherein said transversely oriented members are alternately spaced to contribute to an optimum clearance between adjacent members, to thereby more effectively retain said helmet within said storage compartment.

3. A device providing a helmet storage compartment as claimed in claim 2 wherein the flexible construction material of said members is preferrably a hardened steel of an elongated rectangular shape.

4. A device providing a helmet storage compartment as claimed in claim 3 wherein said pivotal end to end interconnections for said horizontally oriented members also serve as said pivotal connections for said transversely oriented members.

5. A device providing a helmet storage compartment as claimed in claim 4 wherein said transversely oriented members are of a standard comparatively large size, and said horizontally oriented members are of a standard smaller size but of a number to contribute to an adequate size for said storage compartment circumference.

* * * * *